US005493697A

United States Patent [19]

May

[11] Patent Number: 5,493,697

[45] Date of Patent: Feb. 20, 1996

[54] COMMUNICATIONS SYSTEM FOR THE GAME OF FOOTBALL INCLUDING PLAYER-CARRIED TRANSMITTER AND SIDE LINES SPEAKERS FOR OVERCOMING SPECTATOR NOISE

[76] Inventor: Randall L. May, 7712 Talbert Ave., Suite B, Huntington Beach, Calif. 92648

[21] Appl. No.: 112,345

[22] Filed: Aug. 27, 1993

[51] Int. Cl.$^6$ ...................................................... H04B 7/00

[52] U.S. Cl. ............................. 455/66; 455/89; 455/344; 455/351; 381/77; 381/90; 273/55 R

[58] Field of Search .................................... 455/188, 344, 455/351, 109, 90, 89, 88, 79, 82; 2/44, 45, 267, 268; 381/86, 75, 77, 80, 82, 61; 273/55 R, 247, 460

[56] References Cited

U.S. PATENT DOCUMENTS

| | | | |
|---|---|---|---|
| 2,512,828 | 6/1950 | Collins | 381/76 |
| 3,114,105 | 12/1963 | Neumiller | 325/16 |
| 3,370,125 | 2/1968 | Shaw et al. | 381/76 |
| 3,443,031 | 5/1969 | Bolick, Jr. | 381/75 |
| 3,614,321 | 10/1971 | Shaw et al. | 381/105 |
| 3,868,573 | 2/1975 | Holcomb et al. | 325/16 |
| 3,916,312 | 10/1975 | Campbell | 325/16 |
| 3,938,043 | 2/1976 | Desai | 381/77 |
| 4,524,461 | 6/1985 | Koztantly et al. | 455/79 |
| 4,624,337 | 11/1986 | Shavers | 381/89 |
| 4,632,126 | 12/1986 | Aguillar | 273/460 |
| 5,012,221 | 4/1991 | Neuhause et al. | 381/86 |
| 5,131,047 | 7/1992 | Hashimoto et al. | 381/13 |
| 5,142,700 | 8/1992 | Reed | 455/344 |
| 5,187,812 | 2/1993 | Neuhalfen | 2/44 |
| 5,217,229 | 6/1993 | Jaime | 273/247 |

*Primary Examiner*—Andrew I. Faile
*Attorney, Agent, or Firm*—Neal J. Mosely

[57] ABSTRACT

A novel communications system for the game of football allows the quarterback to be heard by his teammates over crowd noise. The communications system comprises a plurality of loudspeakers positioned on opposite sidelines of the playing field in the approach to the goal lines at each end of the field, preferably between the 10 and 20 yard lines. The speakers are aimed or focused at ground level toward the players for selective use whenever the crowd noise is excessive as the team is approaching the goal line. A receiver and amplifier and appropriate circuits are associated with the speakers. A small microphone, transmitter and switch are carried by the quarterback, preferably on his helmet and the safety padding, i.e., shoulder pads. The quarterback may selectively operate the switch whenever the crowd noise becomes excessive to activate the transmitting and receiving equipment to his call of the plays to be transmitted from the microphone to the speakers which direct the calls along the surface to be heard by his teammates. The system is activated only for a short time, on demand by the quarterback, to allow his call of the plays to be heard by the team. The quarterback's calls emitted by the speakers are heard mainly at the level of the playing field and do not interfere with the fans enjoyment of the game.

20 Claims, 8 Drawing Sheets

COMMUNICATIONS SYSTEM FOR THE GAME OF FOOTBALL INCLUDING PLAYER-CARRIED TRANSMITTER AND SIDE LINES SPEAKERS FOR OVERCOMING SPECTATOR NOISE

BACKGROUND OF THE INVENTION

1. Field of the Invention

This invention relates generally to communications systems for sporting events and more particularly to a communications system for the game of football allows the quarterback to be heard by his teammates over crowd noise.

2. Brief Description of the Prior Art

Football is a major spectator sport in the United States. The term football, as used herein, refers to U.S. and Canadian football as distinguished from soccer which the rest of the world refers to as "football". U.S. and Canadian style football is known in Europe as "gridiron". The field layout, equipment and rules of the game are well known by most spectators. Nevertheless, it is necessary to give a brief description of the game as a setting for the invention described and claimed herein.

United States football is played by 11-man teams on a field having a playing area 100 yards long and 160 feet wide, marked along its length by parallel lines at 5-yard intervals and goal lines at each end.

The offensive team has four downs, or plays, in which to advance the bah at least 10 yards and thus make another first down. For each first down made, a team gets another series of four downs in which to gain at least 10 more yards. On fourth down or earlier, depending on the strategy, if a team has failed to gain 10 yards, it may choose to punt the ball to the other team or to attempt a field goal.

Before each play begins, the teams face each other on the line of scrimmage, an imaginary line that runs the width of the field and through the point to which the offensive team has advanced. After the ball is positioned, the center snaps, or passes, it through his legs, usually to the quarterback, who begins the play. The quarterback may run with the ball or hand or pass it to a teammate, who will in turn run with it or pass it. The play ends when the ball carrier is tackled, is forced out of bounds, or scores.

In both United States and Canadian professional football, the quarterback calls the plays. The players usually huddle on completion of one play to get the quarterback's instructions. The quarterback then calls out his instructions during his handling an snap of the ball at the start of a play. The intense competitiveness of professional and college football and the intense loyalty of the fans of the respective teams, has resulted in a practice which often is often unfair and for which there is no redress under the rules. Whenever the opposing (visiting) team has advanced the ball far down the field and is in a position where it is likely to score, the fans of the home team, at that end of the field, deliberately scream and yell until the noise is so great that the opposing team cannot hear the calls of their quarterback. This is an unfair situation inasmuch as the home team fans greatly outnumber the visiting team fans so the noise is deliberately directed at the visiting team as a matter of strategy.

There have been suggestions to overcome the problem of crowd noise but none have been put into use. One suggestion has been to have the players use helmets with built in transmitters which broadcast through the field public address system. This has not been practical since because there would be an appreciable time delay of sound reaching the field. Another suggestion has been to provide transceivers which permit two way communication among the players. This has not been satisfactory because it changes the integrity of the game. Also, there is a safety and excessive weight problem with transceivers in the helmet. Furthermore, the professional football leagues do not permit the use of such equipment.

Several U.S. patents illustrate various types of communications equipment for safety helmets.

Reed U.S. Pat. No. 5,142,700 discloses a helmet, such as a motorcycle helmet, construction worker helmet or football helmet with a built in transceiver system.

Hattori U.S. Pat. No. 5,136,657 discloses a helmet with a built in transceiver system having the speaker positioned under the chin guard.

Tisseront U.S. Pat. No. 5,119,505 discloses a helmet with a built in transceiver system beneath the padding.

Grossman U.S. Pat. No. 4,524,461 discloses a helmet, such as a motorcycle helmet, construction worker helmet or football helmet with a built in transceiver system.

Campbell U.S. Pat. No. 3,916,312 discloses a helmet with a built in transceiver system having a speaker tube and ear funnel.

Palmer U.S. Pat. No. 3,889,190 discloses a helmet with a built in transceiver system having a speaker and earphone mounted on pivotal rods.

The present invention is distinguished over the prior art in general, and these patents in particular by providing a novel communications system for the game of football which allows the quarterback to be heard by his teammates over crowd noise and is approved by football authorities. The communications system comprises a plurality of loudspeakers positioned on opposite sidelines of the playing field in the approach to the goal lines at each end of the field, preferably between the 10 and 20 yard lines. The speakers are aimed or focused at ground level toward the players for selective use whenever the crowd noise is excessive as the team is approaching the goal line or when a team is backed up in or near their own end zone. A receiver and amplifier and appropriate circuits are associated with the speakers. A small microphone, transmitter and switch are carried by the quarterback, preferably on his helmet and the safety padding, i.e., shoulder pads. The quarterback may selectively operate the switch whenever the crowd noise becomes excessive to activate the transmitting and receiving equipment to his call of the plays to be transmitted from the microphone to the speakers which direct the calls along the surface to be heard by his teammates. The system is activated only for a short time, on demand by the quarterback, to allow his call of the plays to be heard by the team and then shuts off automatically. The quarterback's calls emitted by the speakers are heard mainly at the level of the playing field and do not interfere with the fans enjoyment of the This invention allows for continuous fan enthusiasm for both offense and defense without interfering with players communication in the game. It eliminates delay of game penalties due to crowd noise and the resulting inability to hear commands. It expedites the game. It allows the players to determine the outcome of the game rather than the noisy fans. It generates better performance on offense because the offensive line has to explode off the line of scrimmage simultaneously to achieve positive blocking results. Without the aid of this invention, linemen have had to wait for movement by the defense before executing their block.

SUMMARY OF THE INVENTION

It is therefore an object of the present invention to provide a new and improved communications system for the game of football which allows the quarterback to be heard by his teammates over crowd noise.

It is another object of this invention to provide a new and improved communications system for the game of football which announces the quarterback's calls through ground level speakers to be heard by his teammates over crowd noise.

Another object of this invention is to provide a new and improved communications system for the game of football which announces the quarterback's calls by a microphone carried on his safety equipment and broadcasts through ground level speakers to be heard by his teammates over crowd noise.

Another object of this invention is to provide a new and improved communications system for the game of football which is selectively activated by the quarterback to announce his calls by a microphone carried on his safety equipment and broadcasts through ground level speakers to be heard by his teammates over crowd noise, the speakers being activated by a radio activated switch.

Other objects of the invention will become apparent from time to time throughout the specification and claims as hereinafter related.

The above noted objects and other objects of the invention are accomplished by a novel communications system for the game of football which allows the quarterback to be heard by his teammates over crowd noise. The communications system comprises a plurality of loudspeakers positioned on opposite sidelines of the playing field in the approach to the goal lines at each end of the field, preferably between the 10 and 20 yard fines. The speakers are aimed or focused at ground level toward the players for selective use whenever the crowd noise is excessive as the team is approaching the goal line or when a team is backed up in or near their own end zone. A receiver and amplifier and appropriate circuits are associated with the speakers. A small microphone, transmitter and switch are carried by the quarterback, preferably on his helmet and the safety padding, i.e., shoulder pads. The quarterback may selectively operate the switch whenever the crowd noise becomes excessive to activate the transmitting and receiving equipment to his call of the plays to be transmitted from the microphone to the speakers which direct the calls along the surface to be heard by his teammates. The system is activated only for a short time, on demand by the quarterback, to allow his call of the plays to be heard by the team. The quarterback's calls emitted by the speakers are heard mainly at the level of the playing field and do not interfere with the fans enjoyment of the game.

DESCRIPTION OF A PREFERRED EMBODIMENT THE PLAYING FIELD

Figure 1:
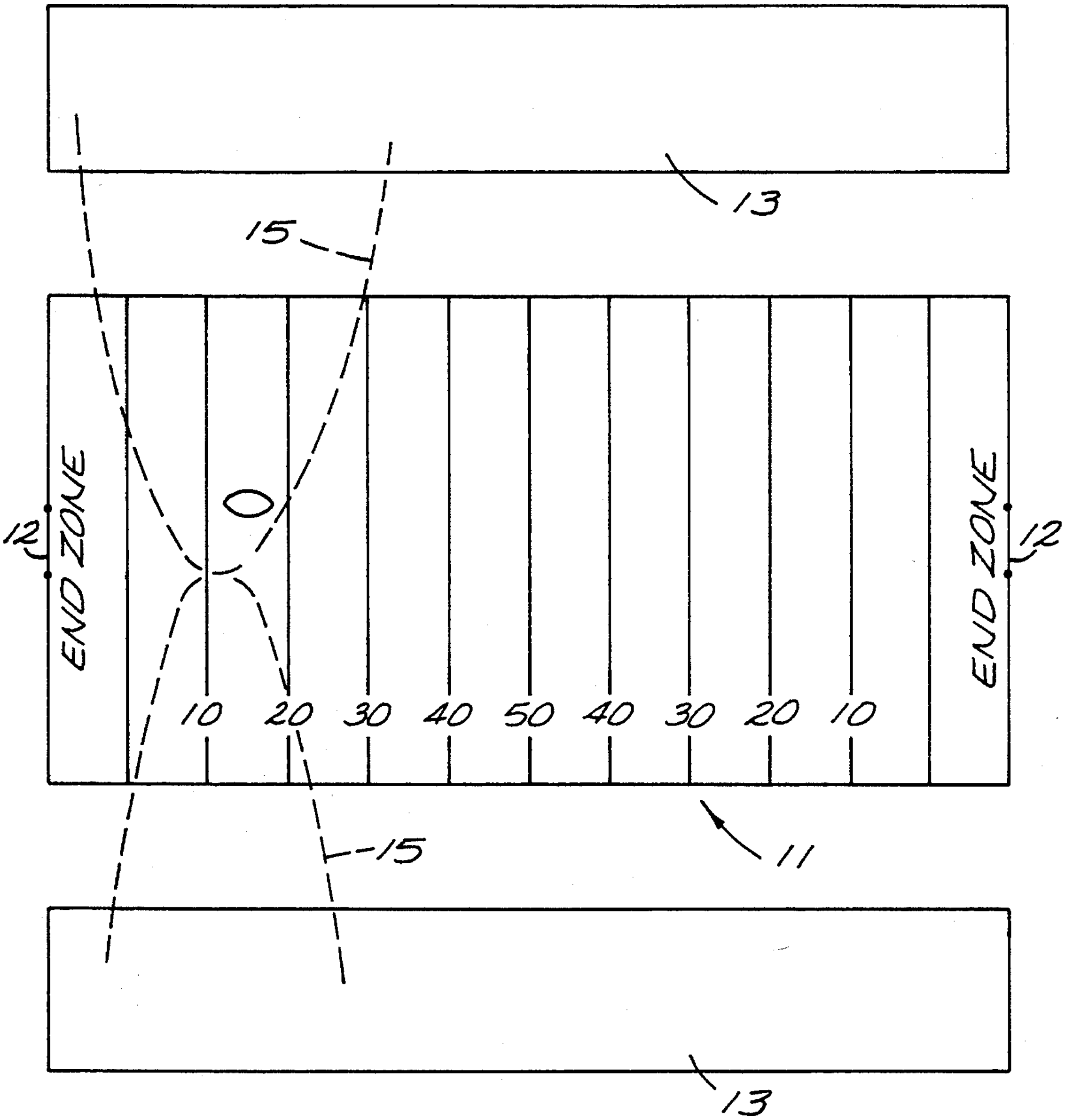
FIG. 1 is a plan view of a football field and spectator stands illustrating the effect of crowd noise.

Referring to the drawings by numerals of reference, FIG. 1 shows a football field 11 having cross stripes or lines at five yard (only the ten yard lines are shown) intervals along the length of the field, with end zones and goal posts 12 at opposite ends of the field. Bleachers or stands 13 are shown on opposite sides of the playing fields. Professional football fields and football fields at larger colleges and universities have seating at both ends as well as the sides to completely enclose the field and many professional stadiums are domed or otherwise covered to permit play during cold or inclement weather. In FIG. 1, the ball is shown on about the 15 yard line. If the visiting team has the ball in this near scoring position, they can expect to encounter unreasonable crowd noise. Dotted lines 15 indicate the focusing of noise on the team carrying the ball. This noise can make it almost impossible for the calls by the quarterback to be heard by his teammates when he calls the plays at the defensive end of the field of if backed up toward the team's own goal line.

THE COMMUNICATIONS SYSTEM

Figure 2:
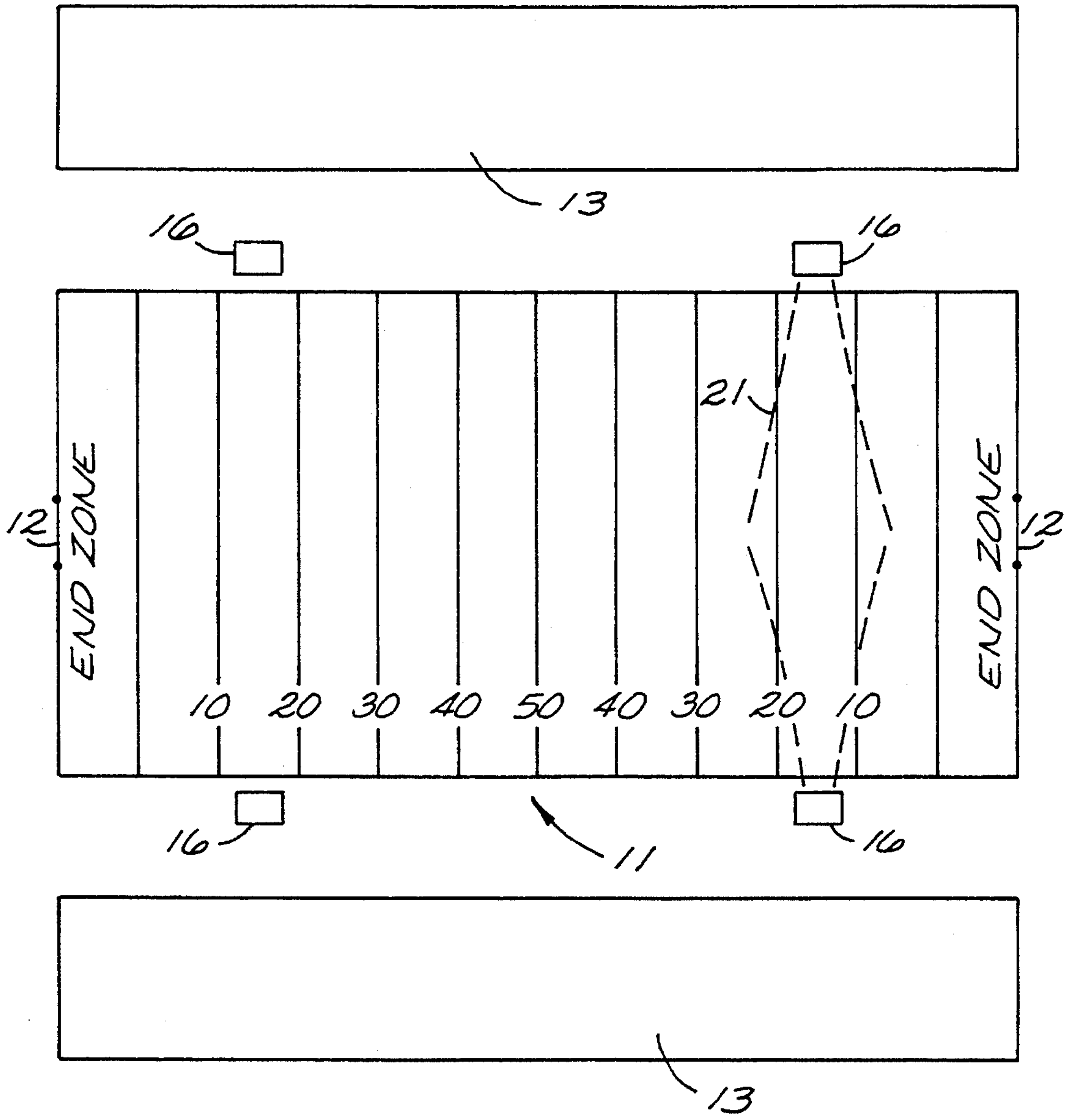
FIG. 2 is a plan view of a football field and spectator stands illustrating the use of the sidelines speakers of this communications system in overcoming the effect of crowd noise.

This invention involves the use of a communications system (see FIG. 2) which allows the calls of the quarterback to be broadcast to the team at the ground level at the end of the field near the goal lines. The quarterback speaks through a microphone and transmitter carried on his helmet and safety equipment, i.e., shoulder pads, which transmits to a command center which in turn transmits to cluster of speakers in a cabinet 16 (see FIG. 2) located on the sidelines at about the 15 yard line. There are four such cabinets 16 positioned on opposite sides of the field at about the 15 yard line at each end of the field. While this is the preferred location of the cabinets 16, they may be positioned at other locations along the field as may become necessary. If there is a sufficiently high utilization of the communications system, the field equipment may be installed permanently.

RECEIVER AND SPEAKERS

Figure 3:
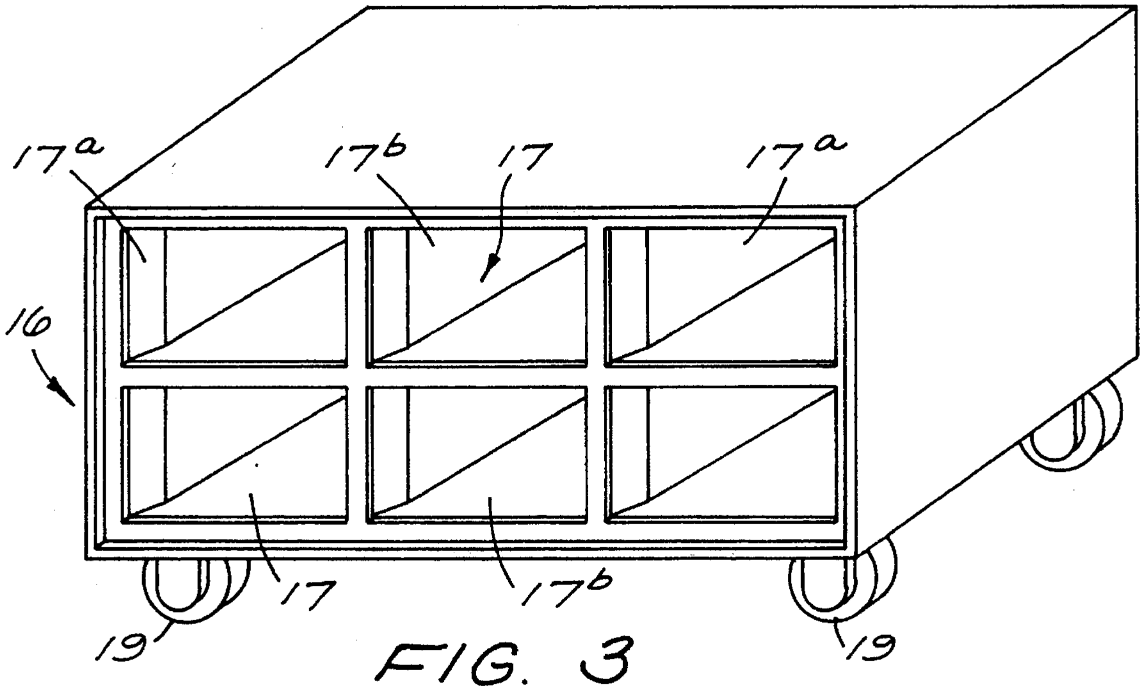
FIG. 3 is an isometric view of a cabinet housing a cluster of speakers for announcing the quarterback's calls at ground level in a focused pattern directed only at the teams.
Figure 4:
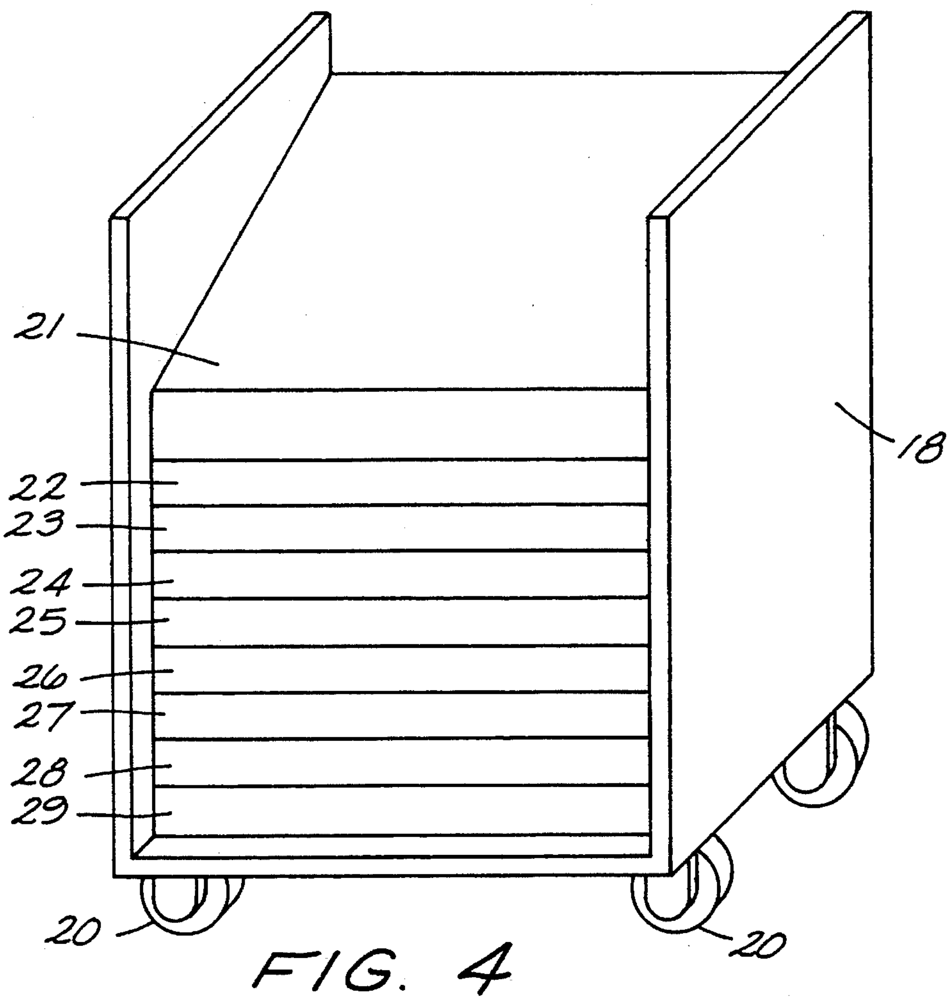
FIG. 4 is an isometric view of a cabinet containing the mixer and associated controls for tuning and focusing the sounds emitted from the cluster of speakers.

The receiver and speaker part of the system consists of cabinets 16, each containing a cluster of six projection horns 17, four of which manifold four midrange speakers each and two of which manifold two high frequency speakers each (see FIGS. 2 and 3) and a command center comprising cabinet 18 containing the radio receiver and mixer (see FIG. 4) for tuning and the amplification is accomplished by the equipment inside cabinets 16 amplifying the signal for broadcasting through speakers 17. Cabinet 16 and speakers are preferably padded with insolite foam and is supported on casters 19, preferably pneumatically inflated golf cart type tires.

GROUND CLUSTER OF SPEAKERS

The calls of the quarterback are broadcast by the cluster of speakers 17 is a narrow, but slightly spreading beam 21 close to the ground from opposite sides of the field reaching from about the 35 yard line to a point inside the end zone. If the cabinets 16 on opposite sides of the field are positioned up to about 25 feet from the sidelines at about the 15 yard line which gives an active area of signal from the goal line to about the 35 yard line. Anywhere in this zone, when the quarterback activates the system, his voice can clearly be heard. The design of the wheeled portable ground clusters, i.e., cabinets 16 and speakers 17, provides good field coverage but the directional design and positioning of the speakers 17 allows very little sound up into the stands. The system is activated by the quarterback, only two of the clusters 16 of speakers 17 are in use and then only for a short predetermined time, e.g., about 25 seconds.

While any of a number of commercially available speakers may be used for the speakers 17 described above, a particularly suitable projection horn is the Electro-Voice® model HP420 was used in field tests of the system. The HP420 is a wide range, flat-front, high frequency, constant-directivity horn. It offers economy of space where its geometry is "just big enough for the job". The horizontal angle is controlled over a frequency range from 650 Hz to 20 KHz and the vertical angle is controlled from 2.2 KHz to 20 KHz, both with unusual precision and adherence to the intended angle. The fiat front design is especially suitable for a clustered system as used herein. The construction is of fiberglass and zinc for acoustical and mechanical advantage. Equivalent components by the same or other manufacturers may be used herein.

The end speakers 17*a* are midrange speakers which comprise eight ElectroVoice® 1824s/4MT drivers on two HP420 40°×20° horns connected from an ElectroVoice® 7600 A., 200 watts/channel @4 ohms, amplifier. The center speakers 17*b* are high frequency speakers which comprise four Electro-Voice® N/DYMI/2MT drivers on two HP420 40°×20° horns connected from an Electro-Voice® 7300 A., 200 watts/channel @8 ohms, amplifier. The amplifiers are connected from an ElectroVoice® EX-24 3-way crossover 500 Hz. to 1.6 KHz. The crossover is connected from a true diversity receiver frequency "D" (VEGA R-662A PRO PLUS Wireless-Microphone Receiver). This part of the system require 110–120 V. A.C. @30 A. Equivalent components by the same or other manufacturers may be used herein.

COMMAND CENTER

The command center, cabinet 18 supported on casters 20, preferably pneumatically inflated golf cart type tires, comprises a basic mixing device, various signal processors and a radio receiver. The purpose of this command center is to receive the voice transmission from the quarterback on the field, electronically process the signal for optimum clarity and send the signal to the receiver in the ground cluster of speakers 17 to be heard on the field. The overall volume or loudness of the system is fully adjustable by mixer cabinet 18 and can be changed to compensate for different playing fields and the volume of crowd noise. The command center is portable and occupies only a single supporting rack or cabinet 18.

The stereo mixer 21 supported at the top of cabinet 18 is an Electro-Voice® BK 832 stereo mixer (BK 32 Series of stereo mixers). VEGA R-662A PRO PLUS Wireless-Microphone Receiver 22 is supported below the stereo mixer in cabinet 18. This receiver VEGA R-662A is designed to work with a VEGA T-677 Series PRO PLUS DYNEX® III UHF bodypack wireless microphone transmitter. Crossover 23 (Electro-Voice® EX-24 3-way crossover described above) is supported below receiver 22 in cabinet 18 and functions to split the voice into two components of low and high frequency which are processed by the Klark-Teknik dual compressor/limiter/expander 28 (Model DN500) described below providing a gated voice along with uniform level and limited threshhold. A pair of Electro-Voice® graphic equalizers 24 and 25 (Model 2710 ⅓ octave graphic equalizers) are supported below crossover 23 in cabinet 18. The Model 2710 is a boost and cut ⅓/ octave graphic equalizer whose primary purpose is for tuning the overall frequency response of a sound reinforcement system. A pair of Klark-Teknik parametric equalizers 26 and 27 (Model DN405 parametric equalizers) are supported below graphic equalizers 24 and 25 in cabinet 18. Parametric equalizers are used for creative equalization in recording and broadcast studios and are particularly useful in this system to isolate any unwanted frequency regardless of width enhancing gain before feedback. A KlarkTeknik dual compressor/limiter/expander 28 (Model DN500) is supported below parametric equalizers 26 and 27 in cabinet 18. The Model DN500 combines the features of compression, expansion, limiting and peak clipping. A VEGA wireless transmitter 29 (T677 Series UHF Wireless-MIC Transmitter) is supported at the bottom of cabinet 18 which transmits to ground clusters 16. Equivalent components by the same or other manufacturers may be used herein.

TRANSMITTING EQUIPMENT

Figure 5:
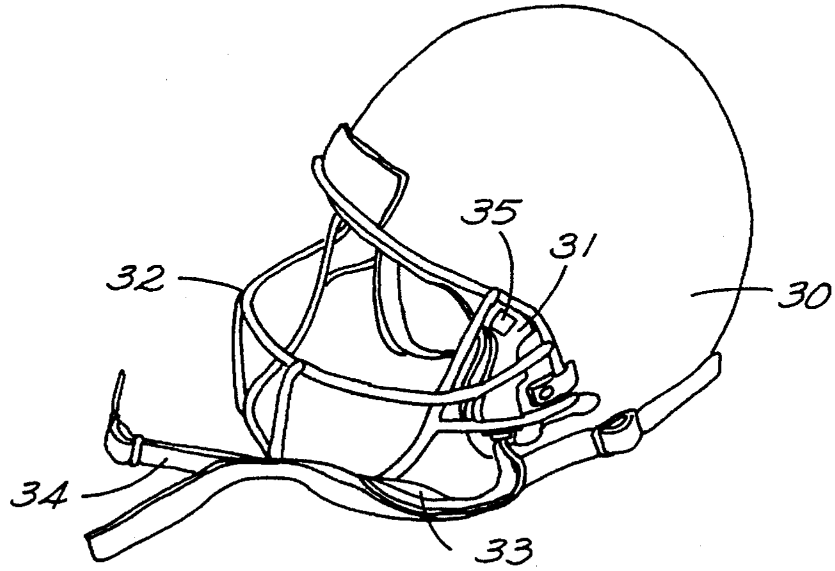
FIG. 5 is an isometric view of a football helmet, worn by the quarterback, which supports and positions the microphone/pre-amp assembly and activation switch for this communications system.
Figure 5A:
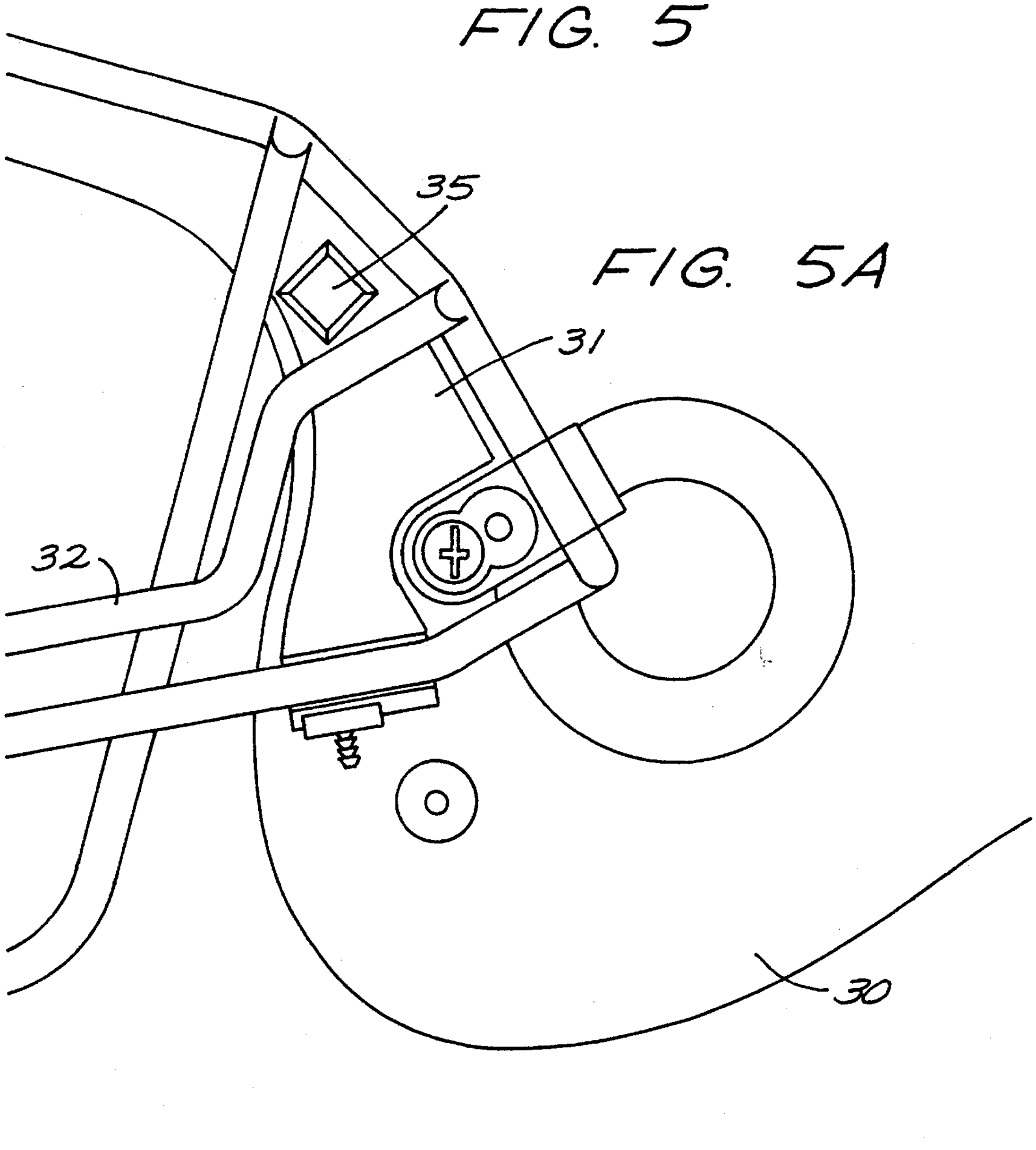
FIG. 5A is a detail view showing the mounting of the microphone/pre-amp assembly and activation (automatic cut-off) switch on the helmet face mask.
Figure 6:
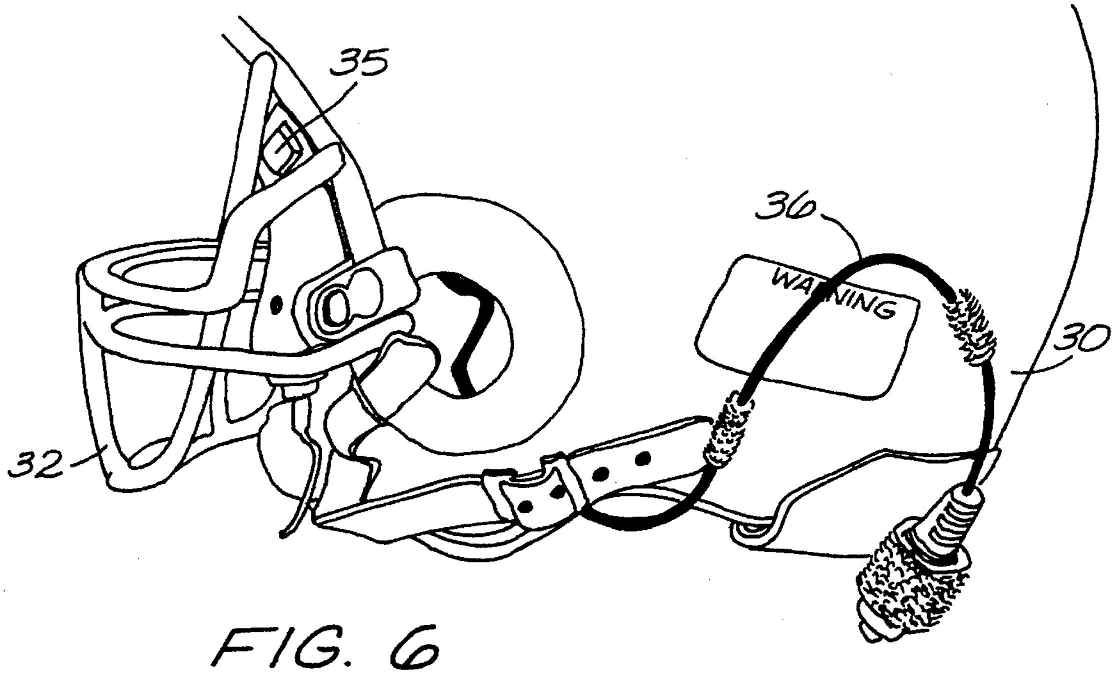
FIG. 6 is a detail isometric view of the football helmet of FIG. 5 showing the activation switch and the headgear cable and connector.
Figure 7:
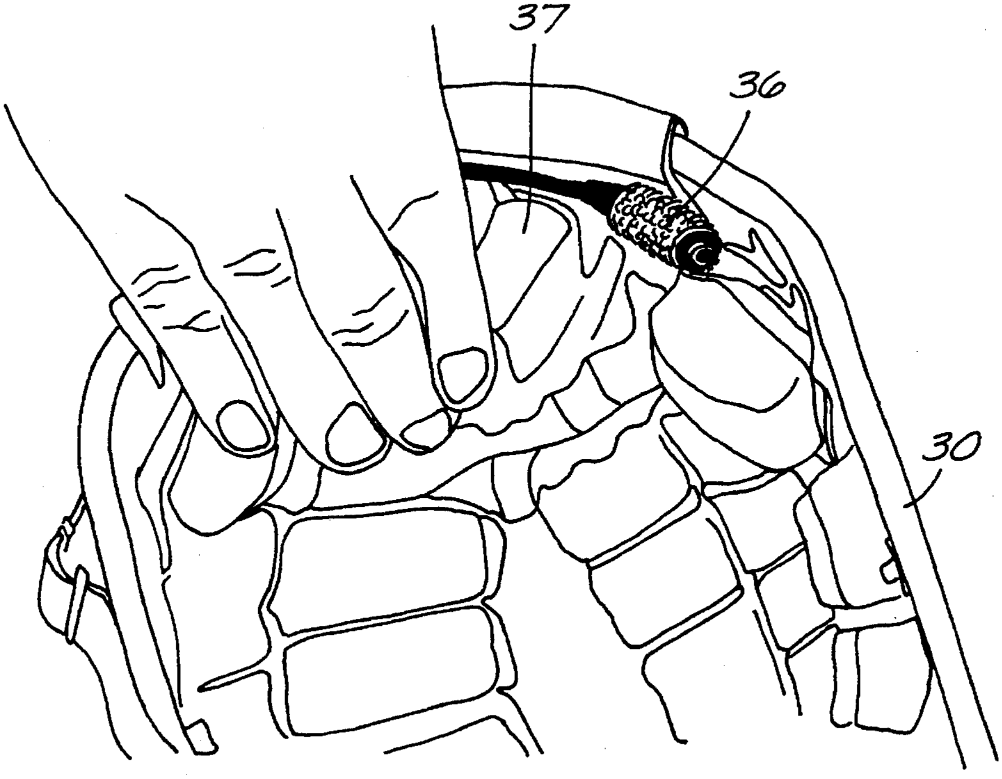
FIG. 7 is a detail isometric view of the football helmet of FIG. 5 showing the headgear cable and connector tucked under the padding when not in use.
Figure 8:
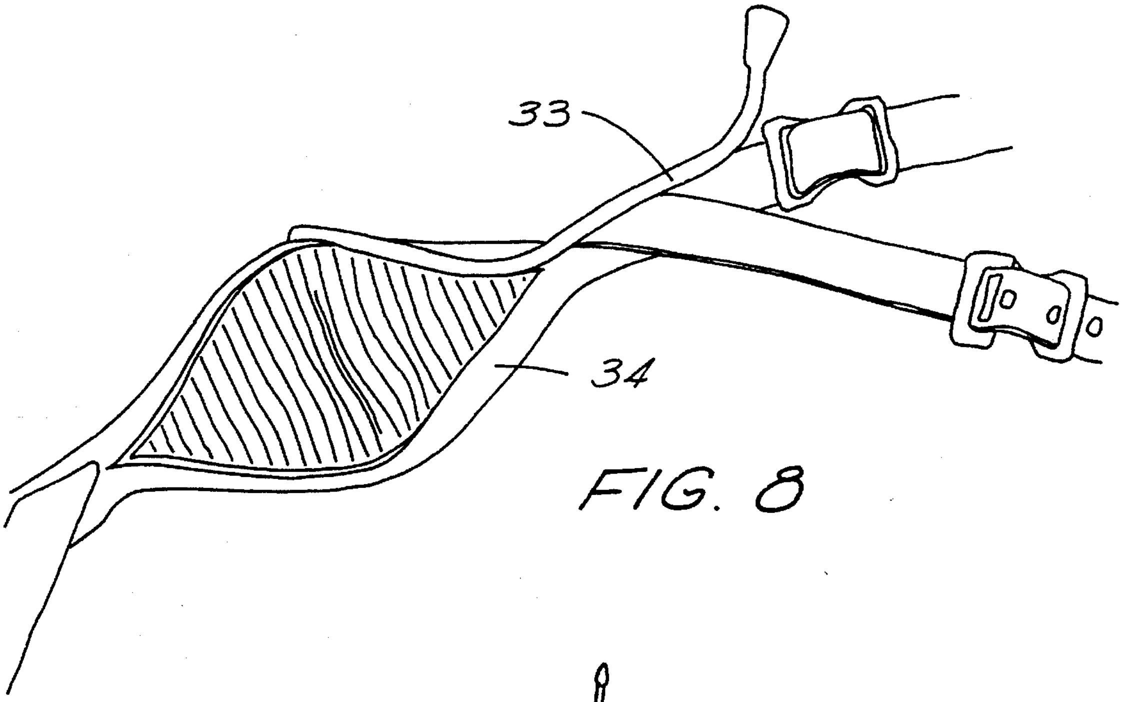
FIG. 8 is a detail view of the chin strap for the helmet with the voice tub supported thereon and the connection to the pre-amp assembly.
Figure 13:
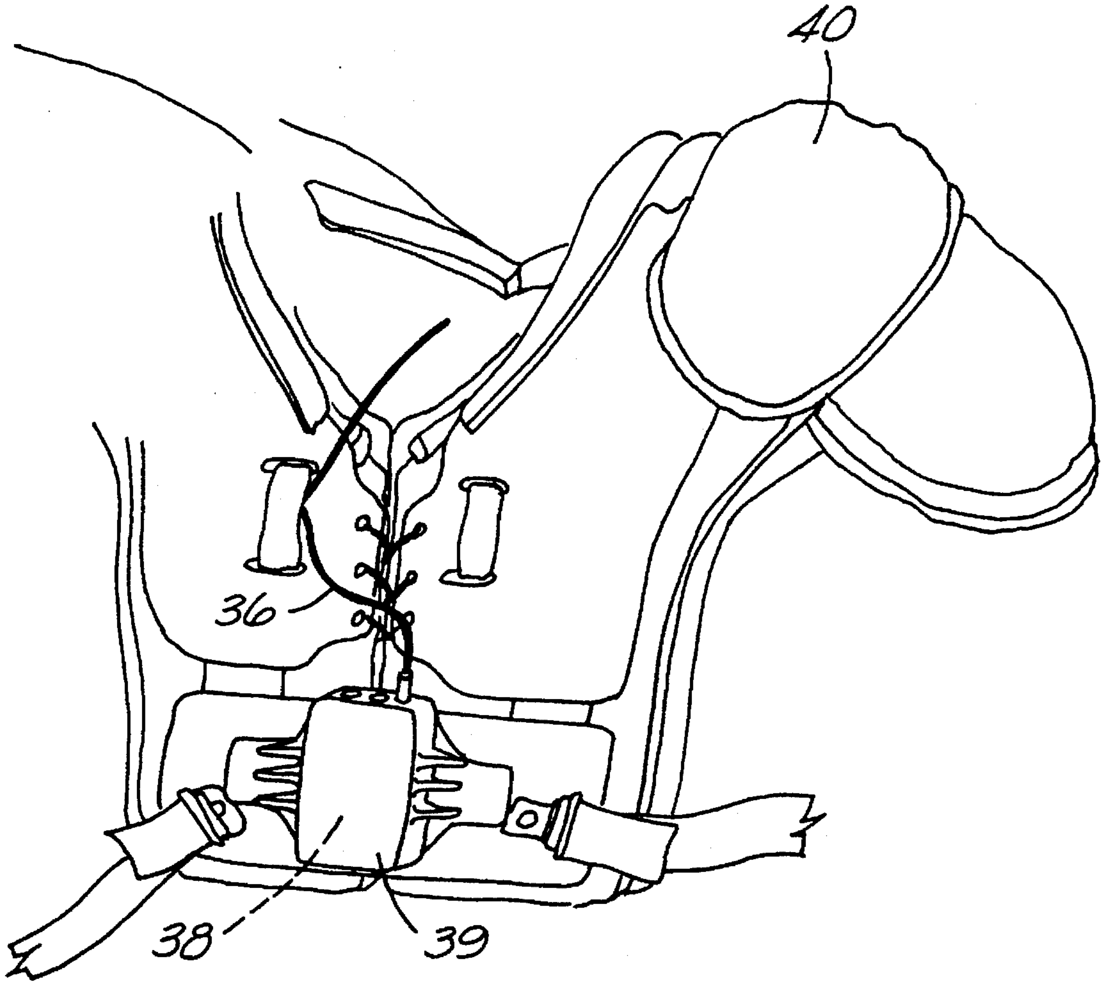
FIG. 13 is a front elevation of the housing on the shoulder pad assembly worn by the quarterback showing the location and mounting of the transmitter.

The quarterback carries the transmitting equipment on his person mounted on his helmet and shoulder pads. The helmet 30 (see FIG. 5) shown is a Riddell helmet which is standard in the National Football League. A microphone/pre-amp assembly 31 is encased within an epoxy shock proof housing and mounted to the face mask 32 adjacent to the helmet 30. A foam filled voice tube 33 is embedded in chin strap 34 (see FIGS. 5 and 8) and, in use, extends from the quarterback's mouth to the microphone/pre-amp assembly 31 to convey his spoken commands to the microphone. This permits his voice to be amplified by the sidelines speakers without amplifying the crowd noise. An activation switch 35 (see FIG. 6) on the micro- phone/pre-amp assembly 31 is operated, as required, by the quarterback to activate the system for a short time, e.g., 25 seconds, to allow him to broadcast his call of the play whenever the crowd noise is excessive. A cable and connector 36 (see FIGS. 6, 7 and 13) is connectable to a transmitter carried on the body of the quarterback (in the shoulder pads—FIG. 13). The cable and connector 36 is stored under the helmet padding 37 (see FIG. 7) when not in use.

Figure 9:
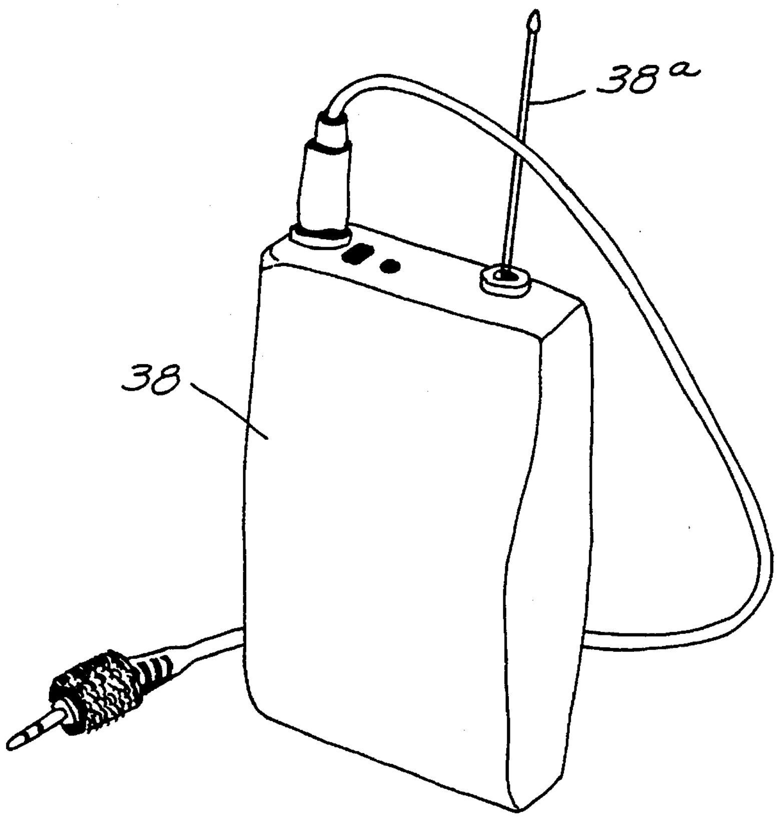
FIG. 9 is an isometric view of the transmitter for the communications system which is supported on the shoulder pads of the quarterback.
Figure 11:
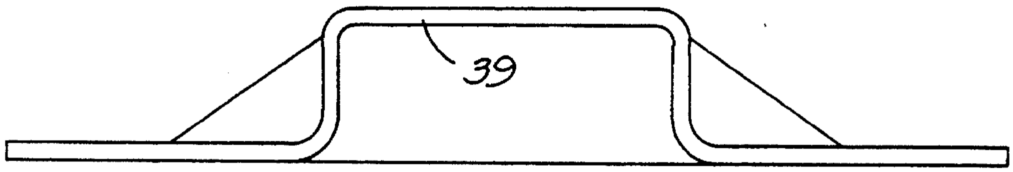
FIG. 11 is a top view of the housing shown in FIG. 10.
Figure 10:
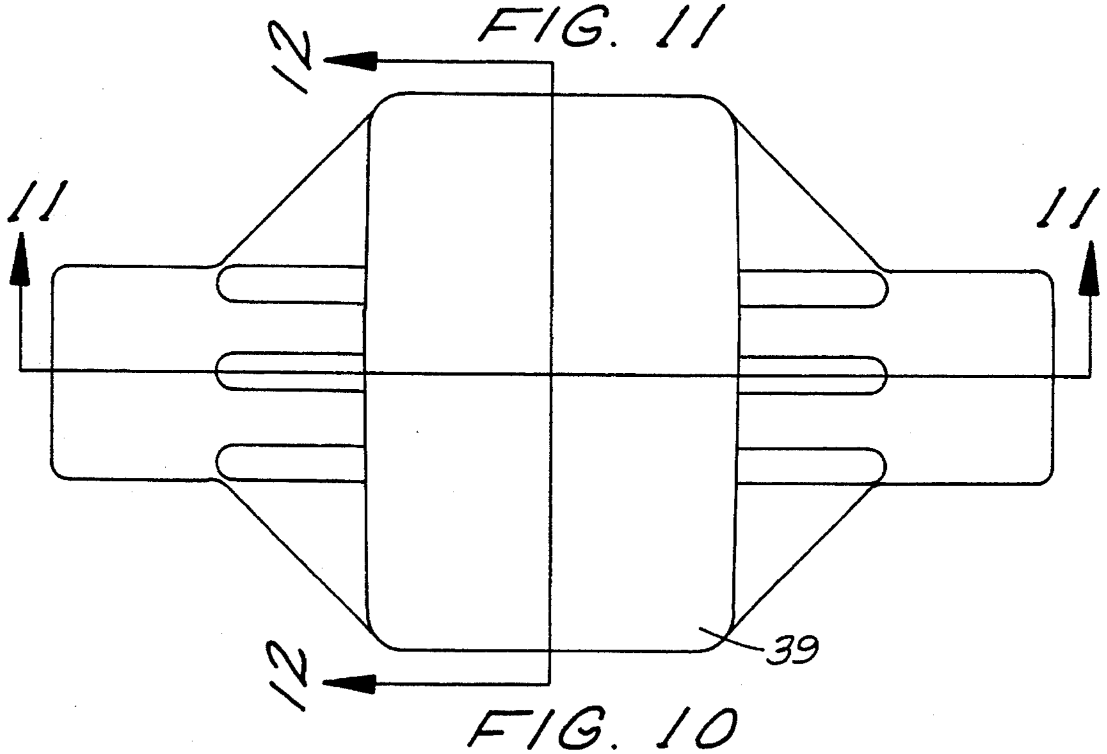
FIG. 10 is a plan view of the housing for the communications system transmitter.
Figure 12:
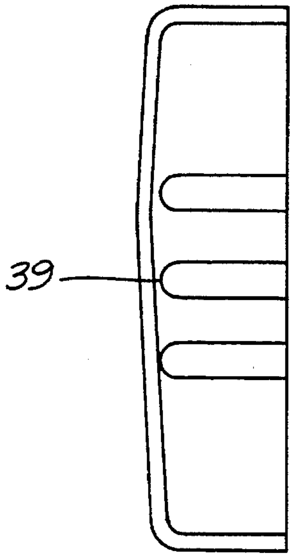
FIG. 12 is a right side view of the housing shown in FIG. 10.

A transmitter 38 (see FIG. 9) is encased in a shock proof case and includes a whip antenna 38*a*, power on/off switch, MIC level control, MIC overload, MIC on/off switch and mini XLR MIC connector (to receive the connector on cable 36 from the helmet 30. A housing 39 for transmitter 38 is shown in FIGS. 10, 11 and 12 for mounting on shoulder pad assembly 40 (see FIG. 13) by Vel-Cro or other suitable means. Equivalent components by the same or other manufacturers may be used herein.

OPERATION

While the description of the individual components should make apparent the use of the system, a brief description of the actual field use of the system is given for clarity and understanding.

The clusters 16 of speakers 17 are positioned alone the sidelines as described above. A pair of the clusters of speakers are positioned at opposite sides of the field near one goal line, e.g., at about the 15 year line. A second pair of the clusters of speakers are positioned at opposite sides of the field near the other goal line, e.g., at about the 15 year line. The transmitting equipment is installed in the helmet, face mask, chin strap and shoulder pad assembly worn by the quarterback as described above.

The game proceeds in the conventional manner. The quarterback calls the plays. The players usually huddle on completion of one play to get the quarterback's instructions. The quarterback then calls out his instructions during his handling and snap of the ball at the start of a play. When the visiting team has advanced the ball far down the field and is in a position where it is likely to score (or in an adverse position at the opposite end of the field), the fans of the home team, at that end of the field, deliberately scream and yell until the noise is so great that the opposing team cannot hear the calls of their quarterback. This is an unfair situation inasmuch as the home team fans greatly outnumber the visiting team fans so the noise is deliberately directed at the visiting team as a matter of strategy. Previously, there has been no redress for this problem.

In the use of this communications system the quarterback's calls are amplified and broadcast from the sidelines by the clusters of speakers 16 to be heard by his teammates over crowd noise. The speakers are aimed or focused at ground level toward the players for selective use whenever the crowd noise is excessive as the team is approaching the goal line. The quarterback may selectively operate the switch 35 whenever the crowd noise becomes excessive to activate the transmitting 38 and receiving 29 equipment to his call of the plays to be transmitted from the microphone 33 via the command center to the speakers 17 which direct the calls along the surface to be heard by his teammates.

The system is activated only for a short time and automatically cuts off, e.g., after 25 seconds (but may be adjusted to other time periods) on demand by the quarterback, to allow his call of the plays to be heard by the team. The reception at the command center is cut off by the sound engineer reducing the volume to zero whenever the bah is snapped by the quarterback which avoids any accidental transmission after the play has started. The automatic deactivation of the micro-phone/pre-amp by the switch 35 avoids unauthorized monitoring of the transmission frequency by outsiders. The quarterback's calls emitted by the speakers are heard mainly at the level of the playing field and do not interfere with the fans enjoyment of the game. The intensity of the sound from the speakers 17 and the focusing of the sound along the ground toward the players overpowers the crowd noise and amplifies the quarterback's commands without amplifying crowd noise. Field tests of the system have demonstrated its effectiveness. Calculations and measurements of the output from the speakers show that the level of sound from the speakers can be up to 10–15 decibels higher than the noise level of the crowd. Since the decibel scale is logarithmic, it is clear that this system easily overpowers the crowd noises at the level of the playing field. There is no problem with the opposing team overhearing the quarterback's calls since they could hear him anyway if the crowd weren't so noisy.

While this invention has been described fully and completely with special emphasis upon a preferred embodiment, it should be understood that within the scope of the appended claims the invention may be practiced otherwise than as specifically described herein.

I claim:

1. A communications system for the game of football played by teams of players on a field having a rectangular playing area marked along its length by parallel lines at selected intervals and goal lines at each end, said players wearing helmet with face mask, and shoulder pads for safety, one player of each team being responsible for initiating and calling the plays to his teammates, and wherein at various times, the noise of the crowd viewing the game is so great that the players on the team advancing the bail cannot hear the calls of their quarterback, said system comprising:

acoustical broadcast means positioned at selected points at about ground level adjacent to said playing field focused for transmission of sound along the ground at the level of the playing field to be heard primarily by the players over the crowd noise; and wireless transmitting means adapted to be carried by said one player on his player protective gear operable to transmit his call of the plays to said broadcast means adjacent to said playing field to amplify and transmit said calls acoustically along the ground to his teammates on said playing field at a sound level overpowering the noise of the crowd, and said acoustical broadcast means including means for inactivating transmission from said one player to said speakers after the ball is snapped and a play commenced.

2. A communications system for the game of football according to claim 1 in which:

said acoustical broadcast means transmits said calls acoustically from said one player to his teammates at a sound level of up to 10–15 decibels louder than the noise of the crowd.

3. A communications system for the game of football according to claim 1 in which:

said wireless transmitting means includes means activating it for a short selected period of time determined by said one player.

4. A communications system for the game of football according to claim 1 in which:

said acoustical broadcast means includes means for adjusting the volume and clarity of the spoken sound being broadcast and is focused for transmission of sound along the ground at the level of the playing field to be heard primarily by the players.

5. A communications system for the game of football according to claim 1 in which:

said acoustical broadcast means is positioned adjacent to opposite sidelines of the field near the each of the goal lines of the field.

6. A communications system for the game of football according to claim 5 in which:

said acoustical broadcast means is positioned adjacent to opposite sidelines of the field between about the 50 yard line and the goal line at each end of the field.

7. A communications system for the game of football according to claim 1 in which:

said acoustical broadcast means is portable and positioned adjacent to but outside opposite sidelines and movable to selected positions therealong.

8. A communications system for the game of football according to claim 1 in which;

said acoustical broadcast means comprises a wireless receiver and at least one speaker, and said wireless transmitting means comprises a wireless transmitter and microphone carried on the person of said one player on said field.

9. A communications system for the game of football played by teams of players on a field having a rectangular playing area marked along its length by parallel lines at selected intervals and goal lines at each end, said players wearing helmet with face mask, and shoulder pads for safety, one player of each team being responsible for initiating and calling the plays to his teammates, and wherein at various times, the noise of the crowd viewing the game is so great that the players on the team advancing the ball cannot hear the calls of their quarterback, said system comprising:

broadcast speakers positioned at selected points at the ground level adjacent to said playing field, wireless receivers connected to said speakers to transmit signals thereto, a wireless transmitter adapted to be carried by said one player on his body, a microphone assembly carried by said one player comprising a voice tube positioned adjacent to his mouth and connected to a microphone supported on said face mask, said microphone being connected to said wireless transmitter to transmit his call of the plays to said wireless receiver and said broadcast speakers to amplify and transmit said calls acoustically to his teammates at a sound level overpowering the noise of the crowd.

10. A communications system for the game of football according to claim 9 in which:

said broadcast speakers further comprise the wireless receiver and at least one speaker, and said wireless transmitter comprises the wireless transmitter and microphone carried on the helmet and shoulder pads of said one player on said field.

11. A communications system for the game of football according to claim 9 in which;

said broadcast speakers further comprise the wireless receiver and at least one speaker, and said wireless transmitter comprise the microphone carried on the helmet adjacent the mouth and the wireless transmitter carried on the shoulder pads of said one player on said field.

12. A communications system for the game of football according to claim 9 in which:

said voice tube is a foam filled tube, and said microphone is supported on the side of said helmet on said face mask.

13. A communications system for the game of football according to claim 9 in which:

said microphone is supported on the side of said helmet on said face mask and includes a switch for activating said transmitter for a short selected period of time determined by said one player.

14. A communications system for the game of football according to claim 9 in which:

said broadcast speakers transmit said calls acoustically from said one player on said field to his teammates on said field at a sound level up to 10-15 decibels louder than the noise of the crowd.

15. A communications system for the game of football according to claim 9 in which:

said broadcast speakers are positioned adjacent to but outside opposite sidelines of the field near the each of the goal lines of the field.

16. A communications system for the game of football according to claim 9 in which:

said broadcast speakers are positioned adjacent to but outside opposite sidelines of the field between about the 30 yard line and the goal line at each end of the field.

17. A communications system for the game of football according to claim 9 in which:

said broadcast speakers are portable and positioned adjacent to but outside opposite sidelines and movable to selected positions therealong.

18. A communications system for the game of football according to claim 9 including;

wheeled portable ground dusters of broadcast speakers, each comprising a cluster of a plurality of projection horns manifolding four mid-range speakers each and a second plurality of projection horns manifolding two high frequency speakers each, and a command center comprising a radio receiver and mixer for tuning, amplification and volume control.

19. A communications system for the game of football played by teams of players on a field having a rectangular playing area marked along its length by parallel lines at selected intervals and goal lines at each end, said players wearing helmet with face mask, and shoulder pads for safety, one player of each team being responsible for initiating and calling the plays to his teammates, and wherein at various times, the noise of the crowd viewing the game is so great that the players on the team advancing the ball cannot hear the calls of their quarterback, said system comprising broadcast speakers positioned at selected points at the ground level adjacent to said playing field, wireless receivers connected to said speakers to transmit signals thereto, a wireless transmitter adapted to be carried by said one player on his body, a microphone adapted to be carried by said one player positioned adjacent to his mouth and connected to said wireless transmitter to transmit his call of the plays to said wireless receiver and said broadcast speakers to amplify and transmit said calls acoustically to his teammates at a sound level overpowering the noise of the crowd, and said broadcast speakers including means for adjusting the volume and clarity of the spoken sound being broadcast and said broadcast speakers being focused for transmission of sound along the ground at the level of the playing field to be heard primarily by the players and means for inactivating transmission from said one player to said speakers after the bail is snapped and a play commenced.

20. A communications system for the game of football according to claim 19 in which:

said wireless transmitter is supported on the shoulder pads of said one player on said field.

* * * * *